(12) United States Patent
Khan et al.

(10) Patent No.: US 7,082,508 B2
(45) Date of Patent: Jul. 25, 2006

(54) DYNAMIC TLB LOCKING BASED ON PAGE USAGE METRIC

(75) Inventors: Moinul H. Khan, Austin, TX (US); Swee-chin Pang, Austin, TX (US)

(73) Assignee: Intel Corporation, Santa Clara, CA (US)

(*) Notice: Subject to any disclaimer, the term of this patent is extended or adjusted under 35 U.S.C. 154(b) by 261 days.

(21) Appl. No.: 10/602,509

(22) Filed: Jun. 24, 2003

(65) Prior Publication Data
US 2004/0268071 A1    Dec. 30, 2004

(51) Int. Cl.
*G06F 12/10*    (2006.01)

(52) U.S. Cl. .................. 711/163; 711/205; 711/207; 711/145

(58) Field of Classification Search ........ 711/205–208, 711/163, 145
See application file for complete search history.

(56) References Cited

U.S. PATENT DOCUMENTS

| | | | |
|---|---|---|---|
| 4,084,230 A * | 4/1978 | Matick .................. | 711/5 |
| 5,761,426 A * | 6/1998 | Ishizaki et al. ........... | 709/221 |
| 6,026,472 A * | 2/2000 | James et al. .............. | 711/147 |
| 6,223,256 B1 * | 4/2001 | Gaither ..................... | 711/134 |
| 6,275,917 B1 * | 8/2001 | Okada ...................... | 711/207 |
| 6,779,085 B1 * | 8/2004 | Chauvel .................... | 711/135 |
| 6,848,025 B1 * | 1/2005 | Song et al. ................ | 711/128 |
| 2002/0073282 A1 * | 6/2002 | Chauvel et al. ........... | 711/122 |
| 2004/0139473 A1 * | 7/2004 | Greene ..................... | 725/111 |
| 2005/0235119 A1 * | 10/2005 | Sechrest et al. .......... | 711/158 |

OTHER PUBLICATIONS

Rahin, Mohammad, et al., "Call Admission Control Algorithms in ATM Networks: A Performance Comparison and Research Directions", (Sep. 1998), 26 pages.

Uhlig, Richard, et al., "Design Tradeoffs for Software-Managed TLBs", *ACM Transactions on Computer Systems*, vol. 12, No. 3,(Aug. 1994), pp. 175-205.

* cited by examiner

*Primary Examiner*—Matthew Kim
*Assistant Examiner*—Hetul Patel
(74) *Attorney, Agent, or Firm*—LeMoine Patent Services, PLLC

(57) ABSTRACT

A translation look-aside buffer (TLB) has lockable entries. A number of entries to lock may be determined by counting unique page access instances during an active period of a process, determining a value of a page usage metric for the process, and comparing the value of the page usage metric to values of page usage metrics for other processes. The page usage metric may consider many different factors, including the amount of time a process is active, a frequency of invocation of the process, and a priority level of a process.

29 Claims, 5 Drawing Sheets

DYNAMIC TLB LOCKING BASED ON PAGE USAGE METRIC

FIELD

The present invention relates generally to processors, and more specifically to processors with translation look-aside buffers.

BACKGROUND

Translation look-aside buffers (TLBs) provide a cache-like mechanism useful for increasing the efficiency of virtual-to-physical address translations in processors. By caching recently used translations, some overhead associated with repeated virtual-to-physical address translation may be avoided.

For an operating system running multiple processes, virtual machines associated with the various processes may suffer from "TLB pollution." TLB pollution occurs due to context switches where the TLB entries from an executing process replace TLB entries from a previously executing process. When the previously executing process becomes active again, many address translations may have to be repeated because of TLB pollution.

For the reasons stated above, and for other reasons stated below which will become apparent to those skilled in the art upon reading and understanding the present specification, there is a need in the art for alternate methods and apparatus associated with translation look-aside buffers.

DESCRIPTION OF EMBODIMENTS

Figure 1:
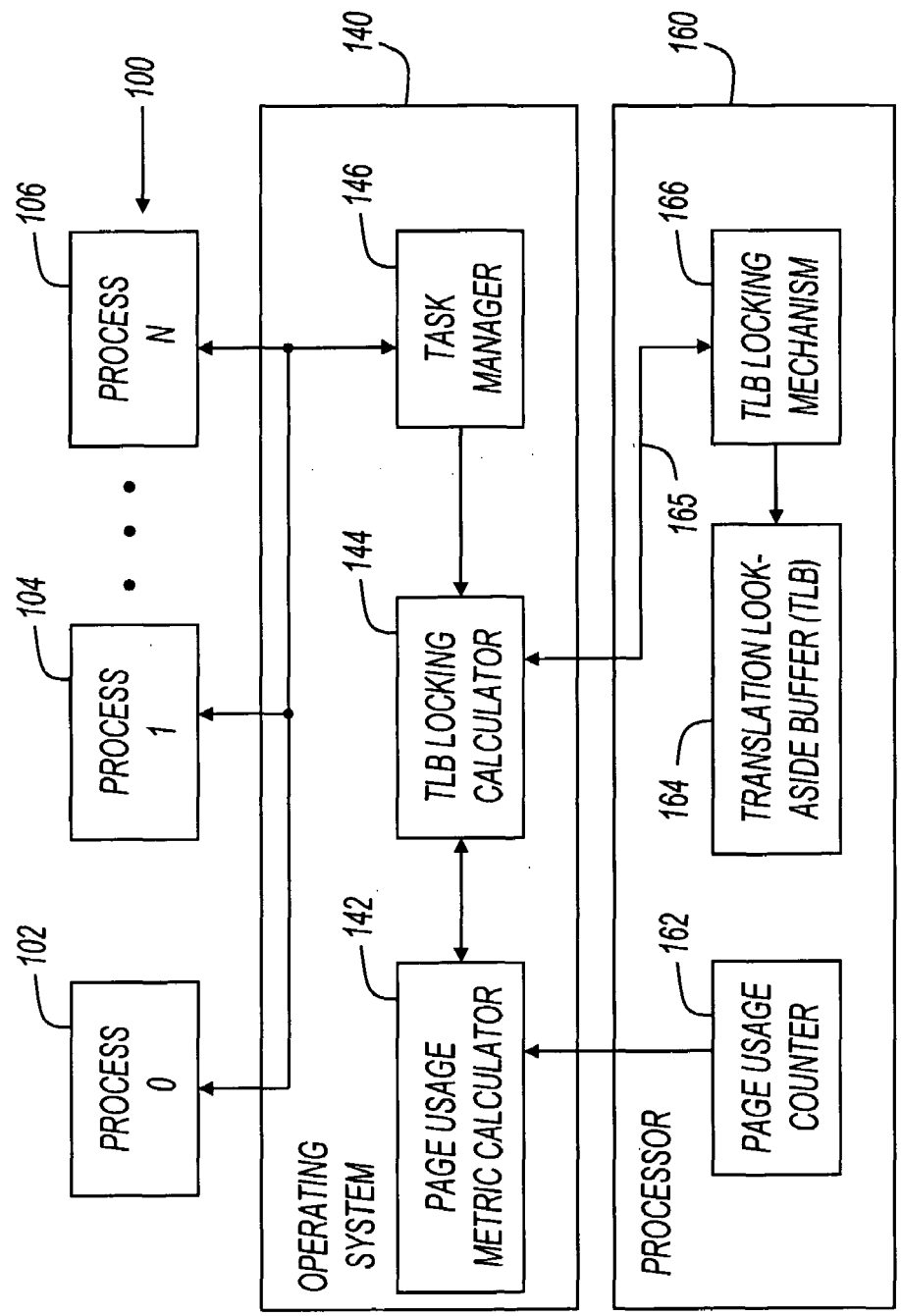
FIG. 1 shows a block diagram of a processor, operating system, and processes.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a block diagram of a processor, operating system, and processes. Processor 160 includes page usage counter 162, TLB 164, and TLB locking mechanism 166. At least one entry within TLB 164 is lockable, and in some embodiments, each entry within TLB 164 is individually lockable. TLB locking mechanism 166 represents a mechanism through which individual entries in TLB 164 may be dynamically locked. In some embodiments, entries in TLB 164 may be locked through interaction with software such as operating system 140. This interaction is shown generally at 165.

When a TLB entry is locked, it may not be removed from TLB 164 until it is unlocked. For example, in some embodiments, processor 160 may have a random TLB entry replacement policy that selects entries to be replaced at random from the set of unlocked TLB entries. In other embodiments, processor 160 may have a least recently used (LRU) replacement policy that selects as a candidate for replacement the least recently used TLB entry from the set of unlocked TLB entries.

For simplicity, processor 160 is shown with one TLB. In some embodiments, processor 160 may have multiple TLBs. For example, processor 160 may have one or more instructions TLBs, and one or more data TLBs. The methods and apparatus of the present invention may be applied to all TLBs within a processor, or to less than all TLBs within a processor.

TLB locking mechanism 166 may be implemented by one or more bits in a register associated with each entry in TLB 164, or the locking mechanism may be implemented using other circuitry. The present invention is not limited by the manner in which entries are locked. Any type of locking mechanism may be used without departing from the scope of the present invention.

Page usage counter 162 may count the number of unique page access instances during a time when a particular process is active. For example, each time a miss occurs in TLB 164, page usage counter 162 may increment to indicate that a page not yet represented in TLB 164 is being accessed. Information from page usage counter 162 may be used for many purposes, including for the calculation of a page usage metric, and for determining how many TLB entries to lock. Processor 160 may include more circuitry than is shown in FIG. 1. For simplicity of illustration, certain portions of processor 160 are accentuated in FIG. 1, and other portions of processor 160 are omitted from FIG. 1.

Operating system 140 runs on processor 160. In some embodiments, operating system 140 includes page usage metric calculator 142, TLB locking calculator 144, and task manager 146. Page usage metric calculator 142 may receive page usage information from page usage counter 162 along with other information, and calculate the value of a page usage metric. Examples of page usage metrics are described below. TLB locking calculator 144 may receive the value of the page usage metric, and calculate a number of TLB entries to be locked. Task manager 146 manages context switching between various processes shown in FIG. 1 as processes 102, 104, and 106.

During execution of a process, the page usage of the process may be measured by page usage counter 162. For example, at the end of each active period, or "quanta" of a process, operating system 140 may retrieve the page usage characteristics from counter 162, and the number counted may be used in the page usage metric calculation to aid in determining the number of TLB entries to be locked. Operating system 140 may dynamically adjust the amount of locking to accommodate newly arriving processes and changes in applications usage. Operating system 140 may also purge locked entries corresponding to a process or application as the process or application terminates.

In some embodiments, a page usage metric value for a process may be compared against a page usage metric value for other processes to determine whether or not to lock TLB entries, and how many to lock. In other embodiments, a page usage metric value for a process may be compared against a sum of page usage metric values for other processes to determine whether or not to lock TLB entries, and how many to lock.

In some embodiments, page usage metric calculator 142 may consider many characteristics of a process when calculating the value of a page usage metric. For example, characteristics such as the existence of real-time constraints, process priority, frequency of invocation, the number of TLB entries previously locked, and others may be considered. In response to these characteristics and others, some processes may be given preference in the allocation of TLB entries to lock. For example in some embodiments, page usage metric calculator 142 or TLB locking calculator 144 give TLB locking preference to a process with a high frequency of invocation or to a process having real-time constraints. These characteristics may be determined in advance of the process running, or they may be determined heuristically by the processor or operating system.

The methods and apparatus shown in FIG. 1 provide a dynamic TLB locking mechanism that allows the operating system to dynamically determine and lock a number of TLB entries for each process (or any subset), in response to the page usage characteristics and other characteristics of each process. Locking TLB entries may reduce the number of TLB misses that occur when an executing process returns, in part because locking protects part of the TLB from pollution by other processes.

Processes 102, 104, and 106 may be processes that are part of one or more software applications. The processes may also be part of the operating system. For example, operating system 140 may be a "microkernel" operating system that utilizes processes to perform many operating system functions. The processes running on processor 160 may be any mixture of operating system processes and application processes without departing from the scope of the present invention.

Processors, TLBs, TLB locking mechanisms, page usage counters, and other embodiments of the present invention can be implemented in many ways. In some embodiments, they are implemented in integrated circuits. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, or the like. Likewise, any embodiment of the present invention can also be represented as a hard macro targeted to a specific manufacturing process. For example, page usage counter 162 may be represented as polygons assigned to layers of an integrated circuit.

Figure 2:
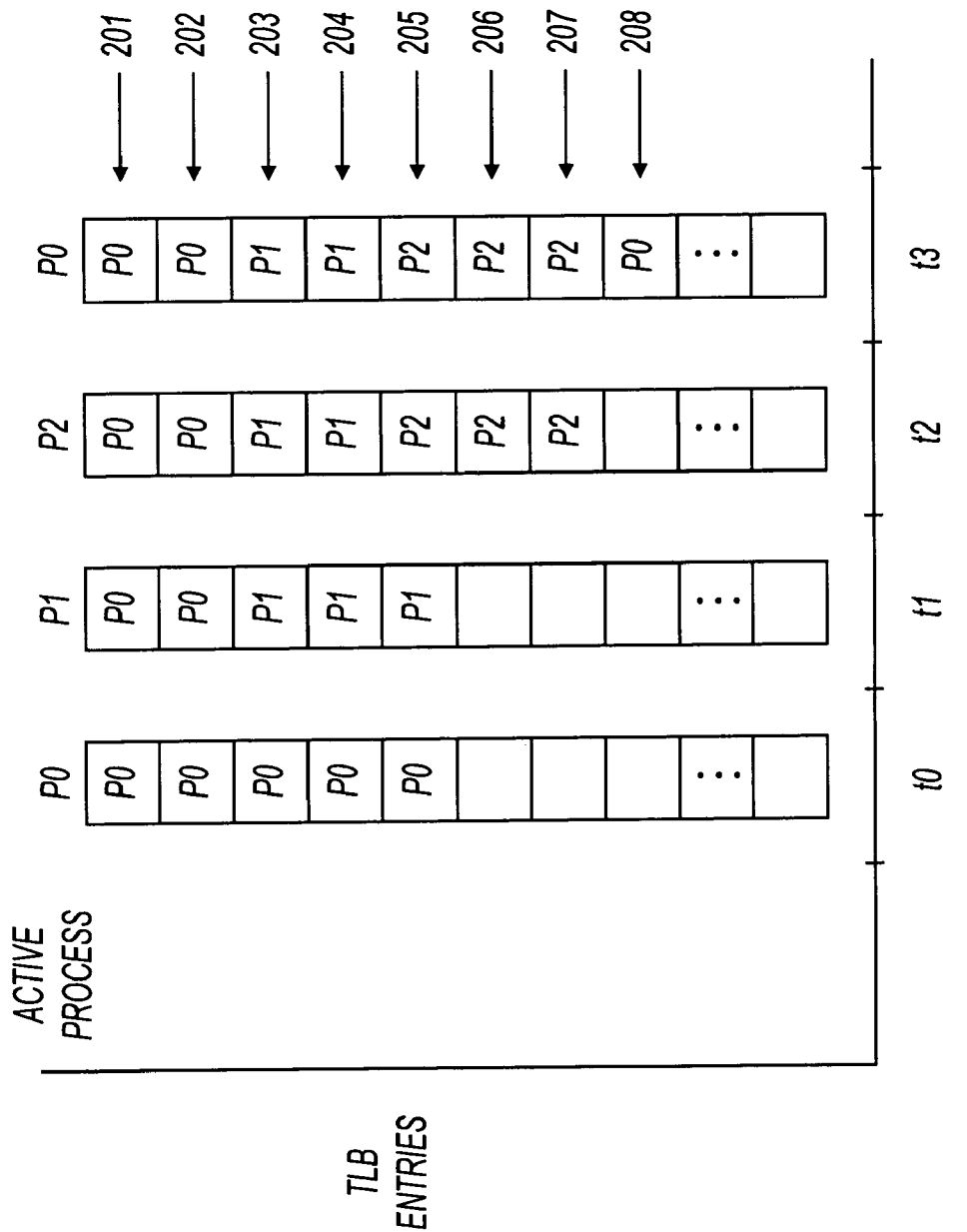
FIG. 2 shows TLB usage over time.

FIG. 2 shows TLB usage over time. For purposes of illustration, four time periods (t0, t1, t2, and t3) are shown, each corresponding to one active period of a process. For example, process P0 is active during time periods t0 and t3; process P1 is active during time period t1; and process P2 is active during time period t2. Usage of TLB entries 201–208 are shown for time periods t0, t1, t2, and t3.

During time period t0, process P0 is active. For purposes of this illustration, it is assumed that the TLB is empty when the active period of P0 represented by t0 begins. TLB entries 201–205 are populated during time period t0. This is indicated in FIG. 2 by "P0" in each TLB entry. At the end of t0, a determination is made whether or not to lock any TLB entries, and how many. In this example, entries 201 and 202 are locked for use by process P0 during a subsequent active period.

During time period t1, process P1 is active. During this time, a number of TLB entries are populated corresponding to process P1. This is shown in FIG. 2 by "P1" appearing in TLB entries 203–205. In practice, if empty TLB entries are available, the processor may choose to utilize empty TLB entries rather than replace existing entries as shown in FIG. 2. At the end of t1, a determination is made whether or not to lock any TLB entries, and how many. In this example, entries 203 and 204 are locked for use by process P1 during a subsequent active period.

During time period t2, process P2 is active. During this time, a number of TLB entries are populated corresponding to process P2. This is shown in FIG. 2 by "P2" appearing in TLB entries 205–207. At the end of t2, a determination is made whether or not to lock any TLB entries, and how many. In this example, entries 205, 206, and 207 are locked for use by process P2 during a subsequent active period.

During time period t3, process P0 becomes active again. If process P0 makes a page access to a page referred to by either TLB entry 201 or 202, the TLB can provide the address translation without the overhead of a TLB miss. If process P0 does incur a TLB miss, another TLB entry will be populated. This is shown at TLB entry 208.

As illustrated in FIG. 2, locking at least one TLB entry during or after an active period of a process allows the at least one entry to be available to a process during at least two active periods of the process. For example, entries 201 and 202 are locked during time period t0 and are made available to process P0 during at least time periods t0 and t3. In some embodiments, locked entries may be made available to a process over many more than two active periods. Also in some embodiments, the number of locked entries for a process may fluctuate from active period to active period.

Figure 3:
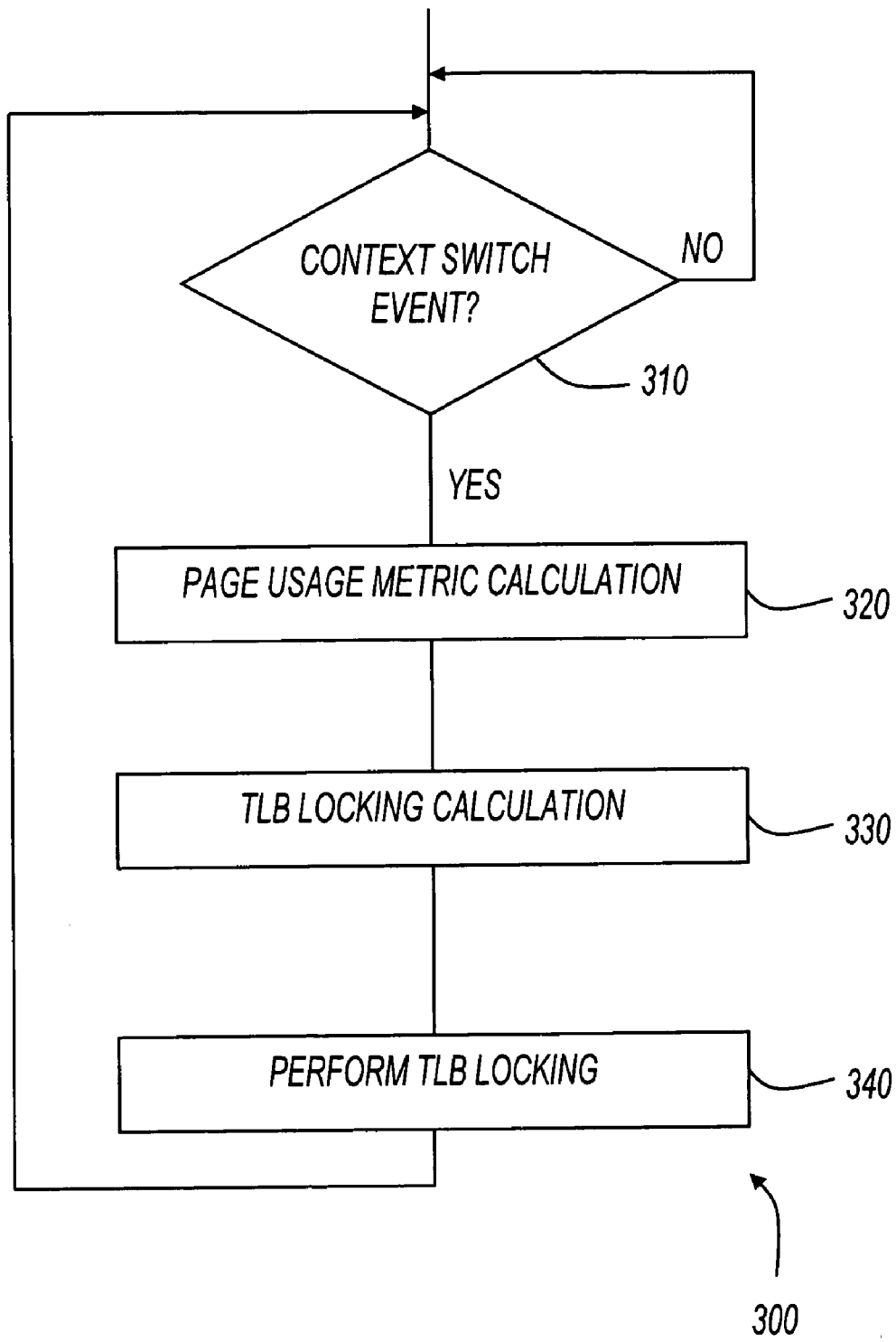
FIG. 3 shows a flowchart in accordance with various embodiments of the present invention.

FIG. 3 shows a flowchart in accordance with various embodiments of the present invention. In some embodiments, method 300, or portions thereof, is performed by a processor, embodiments of which are shown in the various FIGURES. In other embodiments, method 300 is performed by a control circuit, an integrated circuit, or an electronic system. In some embodiments, method 300 is performed by an operating system, such as operating system 140 (FIG. 1) or by a process such as process 102 (FIG. 1). Method 300 is not limited by the particular type of apparatus or software element performing the method. The various actions in method 300 may be performed in the order presented, or may be performed in a different order. Further, in some embodiments, some actions listed in FIG. 3 are omitted from method 300.

Method 300 is shown beginning with block 310. Method 300 remains in a loop around block 310 until a context switch event is detected. A context switch event may occur when an active period of one process comes to an end, and an active period of another process is scheduled to begin. For example, at the end of time period t0 (FIG. 2) a context switch occurs.

In block 320, a page usage metric calculation is performed. The page usage metric may be any calculation that assists method 300 in determining whether or not to lock any TLB entries. For example, the page usage metric may include looking up a flag for each process that indicates to lock entries or not to lock entries. The present invention is not limited with respect to the type of calculation performed as a page usage metric.

An example page usage metric is given by equation 1:

$$\omega_i = \frac{R_i}{b_i} \frac{(a_i - B_{i,n-1}) + \sqrt{(a_i - B_{i,n-1})^2 + 4a_i\alpha_i B_{i,n-1}}}{2a_i} \quad (1)$$

where $$a_i = K_i(1-\alpha_i)R_i, \quad (2)$$

$$\alpha_i = \frac{b_i}{b_i + \lambda_i}, \quad (3)$$

Figure 4:
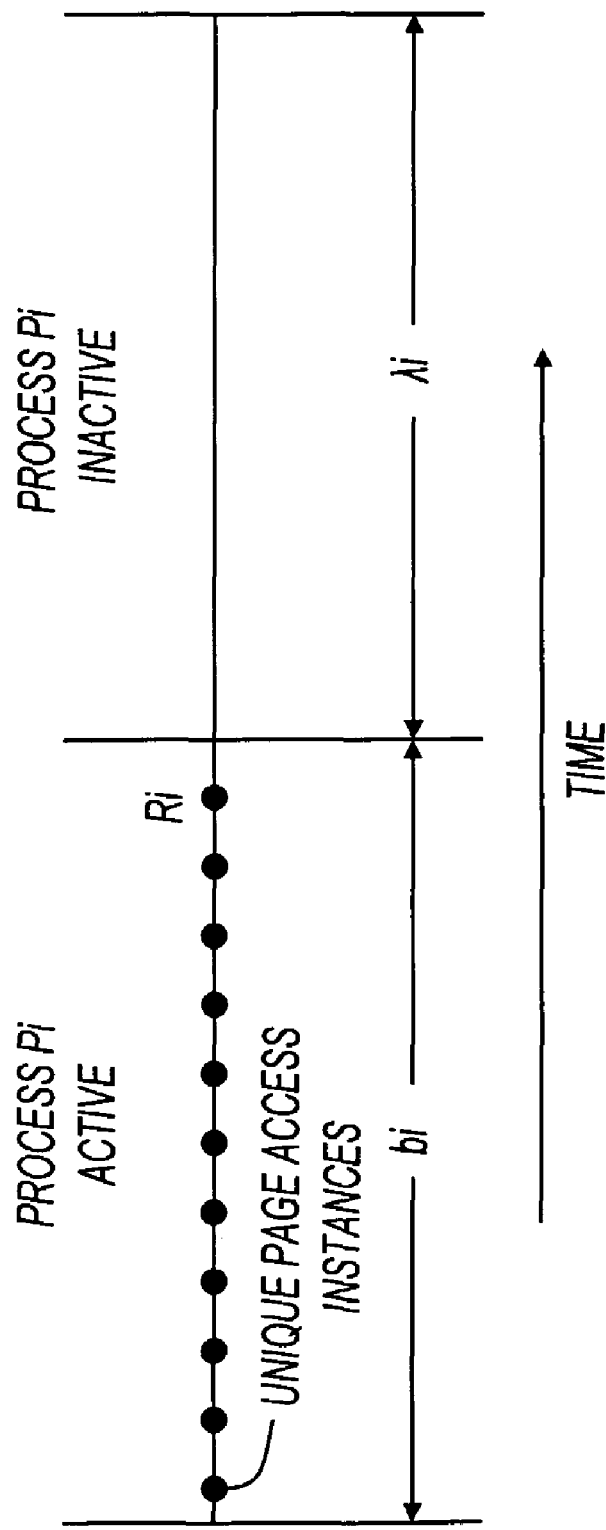
FIG. 4 shows page access instances for a process.

The example page usage metric ($\omega$) calculated in Equation 1 is referred to herein as the effective page usage weight (EPU) of the process. The EPU may be used to help determine the number of TLB entries to lock for each process to reduce TLB pollution. The EPU calculation shown in equations 1, 2, and 3, above, utilize various different kinds of information to determine the value of $\omega$. For example, $B_{i,n-1}$ refers to the number of previously locked TLB entries for process Pi during (n−1)th active period, $b_i$ refers to the amount of time process Pi is active, $R_i$ refers to the number of unique pages accessed during this active period, and $\lambda_i$ refers to the amount of time process Pi is inactive. $b_i$, $R_i$, and $\lambda_i$ are shown in FIG. 4.

K refers to a multiplier that can include any information deemed appropriate to the calculation. In some embodiments, a process's level of priority is included in K. Also in some embodiments, the existence of real-time constraints or the real time nature of the process is included in K. For higher priority and greater real time performance, K may be lowered. Values of K for various processes may be determined in advance, or may be determined by the operating system as the process is running. In some embodiments, K is determined heuristically by the operating system.

Equation 3, above, represents the percentage of time a process is running during one active period. In some embodiments, a percentage is calculated over many time periods and is included in the page usage metric calculation. In some embodiments, a frequency of invocation of a process is determined, and is included in the page usage metric calculation. In embodiments that utilize equation 1, above, the frequency of invocation may be included in the value of K.

Referring now back to FIG. 3, block 330 performs a TLB locking calculation. The TLB locking calculation may utilize the EPU from more than one process in determining how many TLB entries to lock for a particular process. For example, if {P1 . . . PN} processes are running with EPU values of {$\omega_1$ . . . $\omega_n$} and number of entries available for locking is $B_{avail}$, then the number of TLB entries that process Pi may lock at the end of its quanta may be calculated as follows:

$$B_{i,n} = \min\left\{\frac{\omega_i B_{avail}}{\sum_{i=1}^{N} \omega_i}, R_i\right\} \quad (4)$$

According to equation (4), the number of TLB entries to be locked for process Pi on the nth instance, $B_{i,n}$, may be the minimum value of either: the number of entries available for locking weighted by the ratio of the EPU of process Pi to the sum of the EPUs for all processes; or the number of pages accessed by the process Pi during this quanta.

In some embodiments, the most recently used TLB entries may be chosen to be locked. In other embodiments, the most used TLB entries may be chosen to be locked. In block 340, the chosen TLB entries are locked so that they may be available for process Pi during more than one activity period.

Equation 4, above, compares the page usage metric value for a single process to a sum of page usage metric values for all processes running on the processor. In other embodiments, the page usage metric value for the process is compared against a sum of less than all of the processes, or is compared to the page usage metric of one other processor.

The calculation of any metrics or equations may be performed using polynomial approximations. In some embodiments, polynomial approximations of equations or portions of equations may save time in the calculation.

Figure 5:
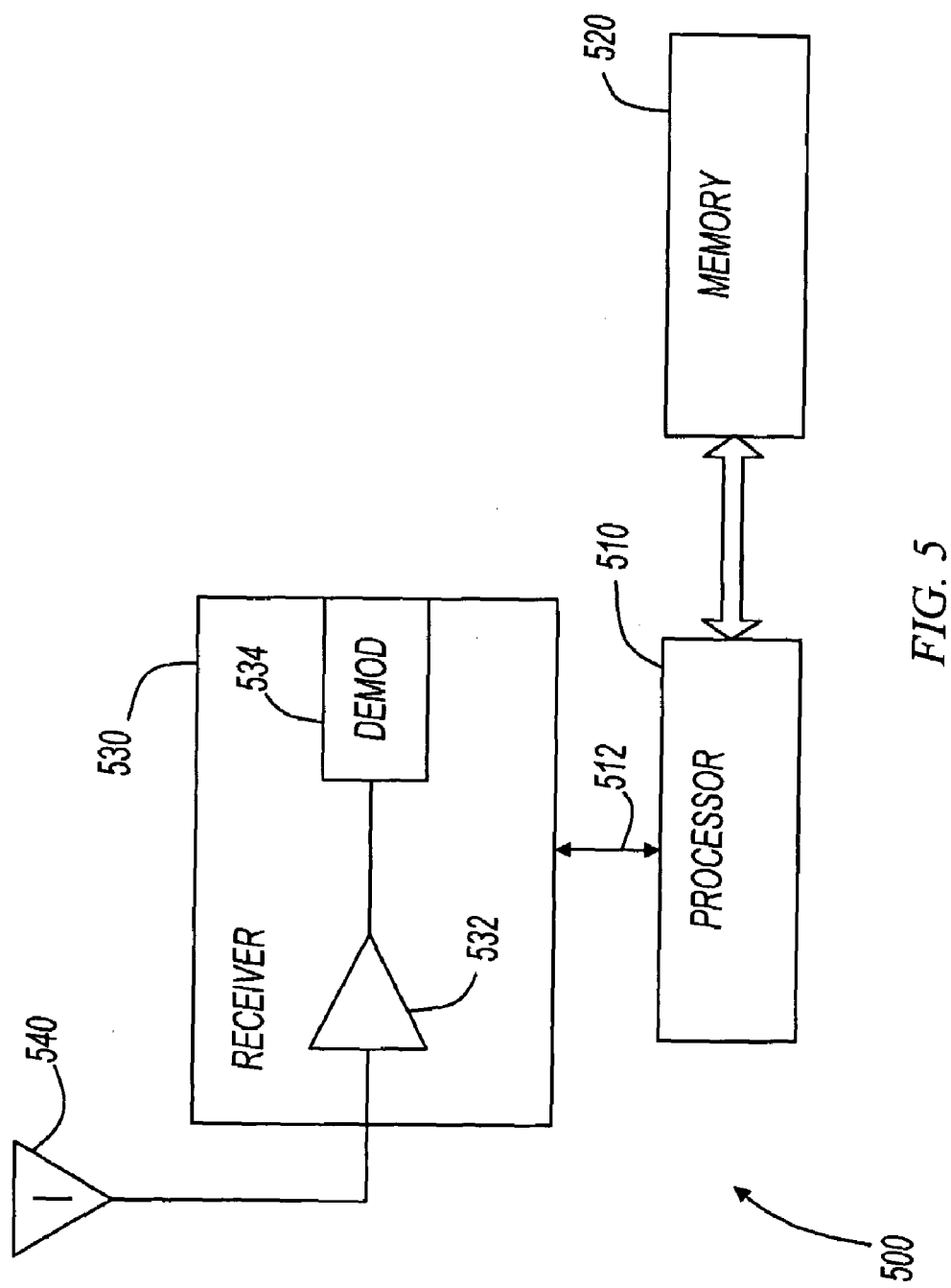
FIG. 5 shows a system diagram in accordance with various embodiments of the present invention.

FIG. 5 shows a system diagram in accordance with various embodiments of the present invention. FIG. 5 shows system 500 including processor 510, memory 520, receiver 530, and antenna 540. Processor 510 may be a processor that includes a lockable TLB as described with reference to the various embodiments of the invention. Further, processor 510 may be a processor that includes a page usage counter such as page usage counter 162 (FIG. 1).

In systems represented by FIG. 5, processor 510 is coupled to receiver 530 by conductor 512. Receiver 530 receives communications signals from antenna 540 and also communicates with processor 510 on conductor 512. In some embodiments, receiver 530 provides communications data to processor 510. Also in some embodiments, processor 510 provides control information to receiver 530 on conductor 512.

Example systems represented by FIG. 5 include cellular phones, personal digital assistants, wireless local area network interfaces, and the like. Many other systems uses for processor 510 exist. For example, processor 510 may be used in a desktop computer, a network bridge or router, or any other system without a receiver.

Receiver 530 includes amplifier 532 and demodulator (demod) 534. In operation, amplifier 532 receives communications signals from antenna 540, and provides amplified signals to demod 534 for demodulation. For ease of illustration, frequency conversion and other signal processing is not shown. Frequency conversion can be performed before or after amplifier 532 without departing from the scope of the present invention. In some embodiments, receiver 530 may be a heterodyne receiver, and in other embodiments, receiver 530 may be a direct conversion receiver.

Receiver 530 may be adapted to receive and demodulate signals of various formats and at various frequencies. For example, receiver 530 may be adapted to receive time domain multiple access (TDMA) signals, code domain multiple access (CDMA) signals, GSM signals, or any other type of communications signals. The present invention is not limited in this regard.

Memory 520 represents an article that includes a machine readable medium. For example, memory 520 represents any one or more of the following: a hard disk, a floppy disk, random access memory (RAM), read only memory (ROM), flash memory, CDROM, or any other type of article that includes a medium readable by processor 520. Memory 520 can store instructions for performing the execution of the various method embodiments of the present invention.

In operation, processor 510 reads instructions and data from memory 520 and performs actions in response thereto. For example, an operating system running on processor 510 may calculate the value of a page usage metric and determine whether or not to lock TLB entries in response to instructions stored in memory 520. Also for example, processor 510 may access instructions from memory 520 and communicate with receiver 530 using conductor 512. Receiver 530 may receive data from processor 510 and provide it to other circuits within receiver 530. Receiver 530 may also receive data from various circuits within receiver 530 and provide it to processor 510. For example, demod 534 may receive control data from processor 510 and may also provide data to processor 510.

Although processor 510 and receiver 530 are shown separate in FIG. 5, embodiments exist that combine the circuitry of processor 510 and receiver 530 in a single integrated circuit. Furthermore, receiver 530 can be any type of integrated circuit capable of processing communications signals. For example, receiver 830 can be an analog integrated circuit, a digital signal processor, a mixed-mode integrated circuit, or the like.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
    determining a number of entries to lock in a translation look-aside buffer (TLB), wherein determining a number of entries to lock comprises counting unique page access instances during an active period of a process, determining a value of a page usage metric for the process, and comparing the value of the page usage metric to values of page usage metrics for other processes; and
    locking, in response to comparing the value of the page usage metric, at least one entry in the translation look-aside buffer (TLB) to make the at least one entry available to the process during at least two active periods of the process.

2. The method of claim 1 wherein determining the value of the page usage metric comprises considering an amount of time the process is active.

3. The method of claim 1 wherein the TLB includes a plurality of entries, the method further comprising determining which of the plurality of entries to lock.

4. The method of claim 3 wherein determining which of the plurality of entries to lock comprises selecting a most recently accessed entry.

5. The method of claim 3 wherein determining which of the plurality of entries to lock comprises selecting a most commonly accessed entry.

6. The method of claim 1 wherein determining the value of the page usage metric comprises considering a number of previously locked TLB entries for the process.

7. A method comprising:
    determining a number of entries to lock in a translation look-aside buffer (TLB), wherein determining a number of entries to lock comprises counting unique page access instances during an active period of a process, determining a value of a page usage metric for the process, and comparing the value of the page usage metric to a sum of values of page usage metrics for a plurality of processes;
    locking, in response to comparing the value of the page usage metric, at least one entry in the translation look-aside buffer (TLB) to make the at least one entry available to the process during at least two active periods of the process.

8. The method of claim 7 wherein determining the value of the page usage metric comprises considering an amount of time the process is active.

9. The method of claim 7 wherein the TLB includes a plurality of entries, the method further comprising determining which of the plurality of entries to lock.

10. The method of claim 9 wherein determining which of the plurality of entries to lock comprises selecting a most recently accessed entry.

11. The method of claim 9 wherein determining which of the plurality of entries to lock comprises selecting a most commonly accessed entry.

12. The method of claim 7 wherein determining the value of the page usage metric comprises considering a number of previously locked TLB entries for the process.

13. A method comprising:
    counting a number of unique page accesses made by a process running on a processor;
    determining a value of a page usage metric from the number of unique page accesses;
    determining a number of TLB entries to lock in response to the value of the page usage metric, wherein determining the number of TLB entries to lock comprises comparing the value of the page usage metric to values of page usage metrics for other processes running on the processor; and
    locking, in response to comparing the value of the page usage metric, at least one translation look-aside buffer (TLB) entry that corresponds to the process.

14. The method of claim 13 wherein determining the number of TLB entries to lock is based, at least in part, on a frequency of invocation of the process.

15. The method of claim 13 wherein determining the number of TLB entries to lock is based, at least in part, on a priority level of the process.

16. The method of claim 13 wherein determining the value of the page usage metric comprises considering an amount of time the process is active.

17. The method of claim 13 wherein determining the value of the page usage metric comprises considering a number of previously locked TLB entries for the process.

18. The method of claim 13 wherein considering the value of the page usage metric and values of page usage metrics for other processes running on the processor comprises comparing the value of the page usage metric to a sum of values of page usage metrics for a plurality of processes.

19. An apparatus including a medium adapted to hold machine-accessible instructions that when accessed result in a machine performing:

counting a number of unique page accesses made by a process;

determining a value of a page usage metric from the number of unique page accesses;

determining a number of TLB entries to lock in response to the value of the page usage metric, wherein determining the number of TLB entries to lock comprises comparing the value of the page usage metric to values of page usage metrics for other processes; and locking at least one translation look-aside buffer (TLB) entry that corresponds to the process.

20. The apparatus of claim 19 wherein the page usage metric is based, at least in part, on a frequency of invocation of the process.

21. The apparatus of claim 19 wherein the page usage metric is based, at least in part, on a priority level of the process.

22. The apparatus of claim 19 wherein determining the value of the page usage metric comprises considering a number of previously locked TLB entries for the process.

23. The apparatus of claim 19 wherein considering the value of the page usage metric and values of page usage metrics for other processes running on the processor comprises comparing the value of the page usage metric to a sum of values of page usage metrics for a plurality of processes.

24. The apparatus of claim 19 wherein determining the value of the page usage metric comprises considering an amount of time the process is active.

25. An electronic system comprising:

an amplifier to amplify communications signals;

a processor coupled to the amplifier, the processor including a translation look-aside buffer (TLB) with lockable entries; and an SRAM storage medium accessible by the processor, the storage medium configured to hold instructions that when accessed result in the processor performing:

counting a number of unique page accesses made by a process;

determining a value of a page usage metric from the number of unique page accesses;

determining a number of TLB entries to lock in response to the value of the page usage metric, wherein determining the number of TLB entries to lock comprises comparing the value of the page usage metric to values of page usage metrics for other processes; and locking at least one TLB entry that corresponds to the process.

26. The electronic system of claim 25 wherein the page usage metric is based, at least in part, on a frequency of invocation of the process.

27. The electronic system of claim 25 wherein determining the value of the page usage metric comprises considering a number of previously locked TLB entries for the process.

28. The electronic system of claim 25 wherein considering the value of the page usage metric and values of page usage metrics for other processes running on the processor comprises comparing the value of the page usage metric to a sum of values of page usage metrics for a plurality of processes.

29. The electronic system of claim 25 wherein determining the value of the page usage metric comprises considering an amount of time the process is active.

* * * * *

UNITED STATES PATENT AND TRADEMARK OFFICE
CERTIFICATE OF CORRECTION

PATENT NO. : 7,082,508 B2
APPLICATION NO. : 10/602509
DATED : July 25, 2006
INVENTOR(S) : Khan et al.

It is certified that error appears in the above-identified patent and that said Letters Patent is hereby corrected as shown below:

In column 9, lines 9-10, in Claim 19, delete "locking at least one" and insert
-- locking, in response to comparing the value of the page usage metric, at least one --, therefor.

In column 10, line 15, in Claim 25, delete "locking at least one" and insert -- locking, in response to comparing the value of the page usage metric, at least one --, therefor.

Signed and Sealed this

Twenty-fourth Day of October, 2006

JON W. DUDAS
*Director of the United States Patent and Trademark Office*